UNITED STATES PATENT OFFICE.

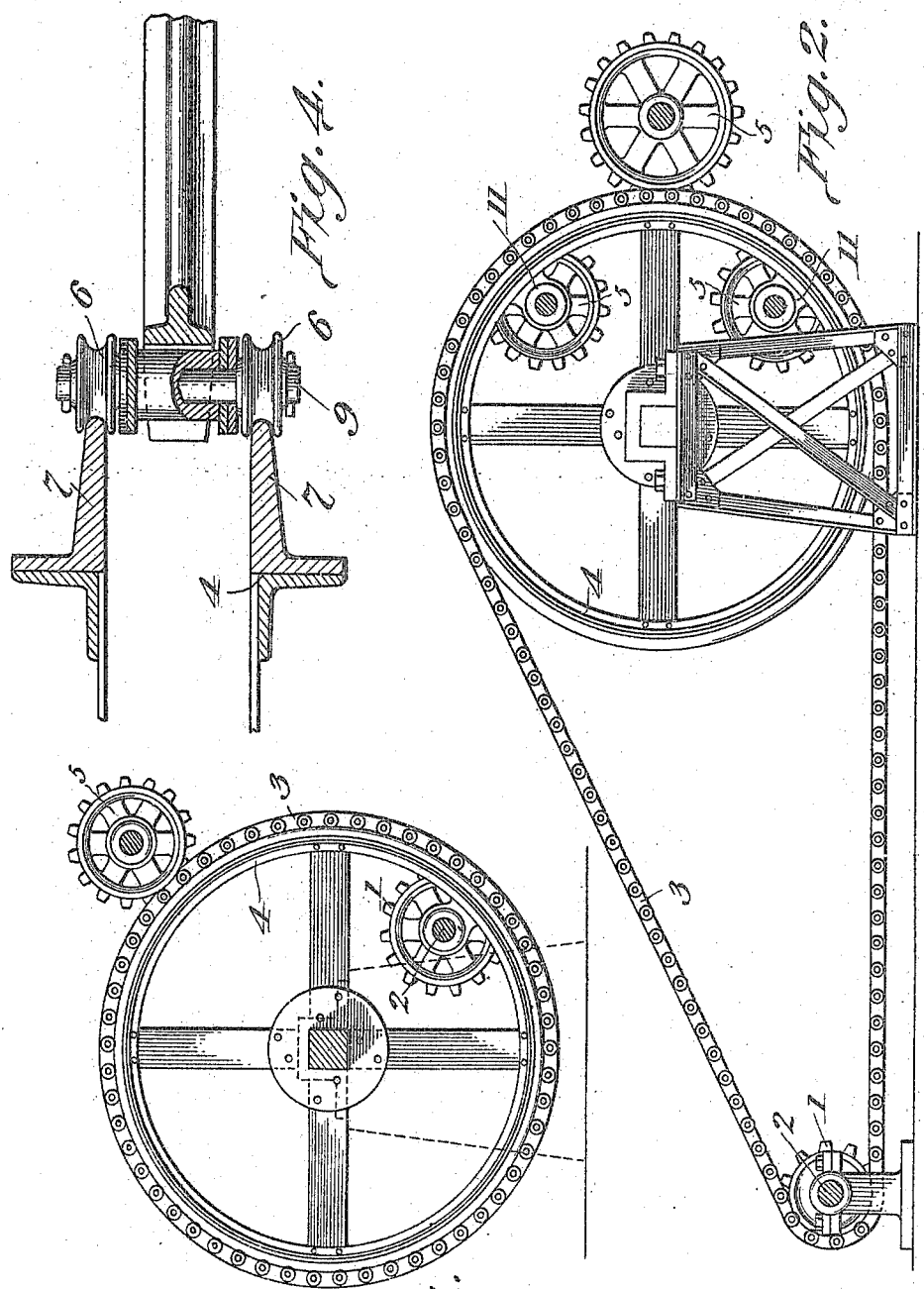

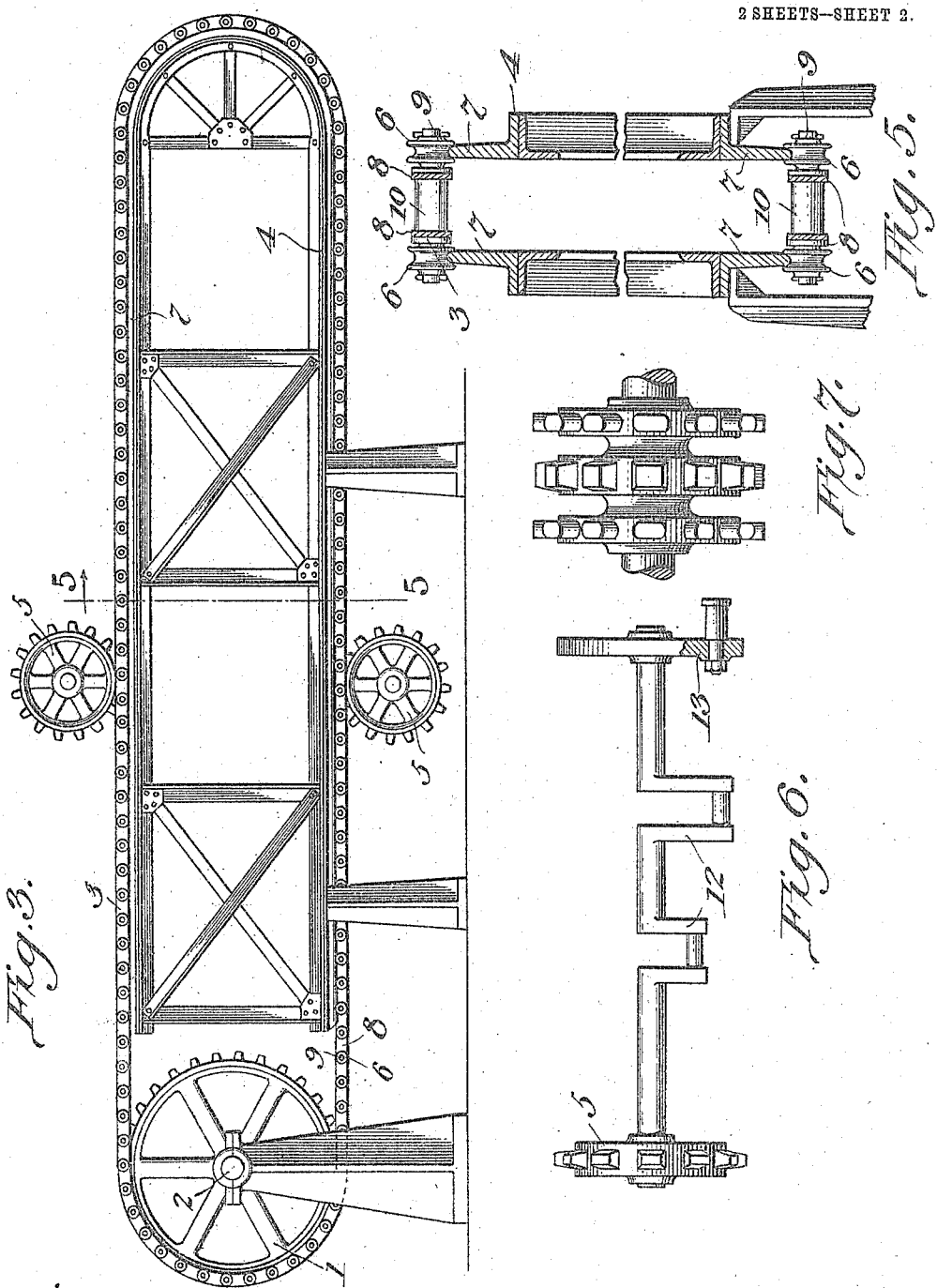

ROBERT HENRY BOWMAN, OF CANON CITY, COLORADO.

CHAIN DRIVING-GEAR.

951,721.          Specification of Letters Patent.      Patented Mar. 8, 1910.

Application filed December 27, 1907. Serial No. 408,277.

*To all whom it may concern:*

Be it known that I, ROBERT HENRY BOWMAN, a citizen of the United States, residing at Canon City, county of Fremont, State of Colorado, have invented certain new and useful Improvements in Chain Driving-Gear; and I do hereby declare the following to be a full, clear, and exact description of the invention, such as will enable others skilled in the art to which it appertains to make and use the same.

This invention relates to a chain driving-gear, and has for its particular object to provide suitable mechanism whereby power may be taken from a single driving shaft and communicated to any desired number of shafts which it is desired to drive for the purpose of operating different types of machinery.

The invention consists of a novel driving chain adapted to be driven around a suitable track-way or guide which affords a support for the chain and gives to said chain, when engaging with the track-way, a certain amount of rigidity or stiffness, thus permitting the sprocket wheels, of the shafts to be driven, to be connected to said chain with advantage.

In the drawings Figure 1 is a side elevation of a chain driving-gear embodying my invention. Fig. 2 is a similar view of a modified form thereof. Fig. 3 is a like view of a still further modification. Fig. 4 is a detail view, partly in section, of the driven gear, drive chain, and its track-way. Fig. 5 is a cross sectional view of the track-way, structure and drive chain, taken on the line 5—5 of Fig. 3. Fig. 6 is a detail view of one of the driven gears and its shaft, and Fig. 7 is a view illustrating a triple form of driving sprocket wheel.

Referring to the drawings, 1 denotes a driving sprocket wheel on the shaft 2, which shaft is driven by any suitable type of motor. This sprocket wheel serves as a means for driving the chain 3, and said chain is adapted to be driven around the curved guide or track-way 4 as clearly shown in the drawing.

The track-way 4 serves as a support and guide for the drive chain, and the respective sprocket wheels 5 of the shafts to be driven engage with the drive chain at points along the track-way, upon the inside or outside of said chain, as may be desired in making the proper connection. It is to be noted that in the drawings, the track-way is illustrated in several different forms. For instance in Fig. 1 the chain is made to exactly fit around the circular track-way, the driving sprocket wheel engaging the chain upon the inside thereof, and the driven sprocket wheels adapted to engage said drive chain at any point along the chain, inside or outside as may be desired. It is to be further understood that the driving sprocket wheel may also be mounted so as to engage the chain upon the outside thereof if so desired, or found necessary.

In Fig. 2 is shown a similar construction to that illustrated in Fig. 1, but in this instance the chain, while passing around a similar track-way, does not exactly fit the same, but the chain is made long enough to lap around the driving sprocket wheel 1, which in this instance is positioned at a distance from the track-way.

The structure illustrated in Fig. 3 shows the track-way as elongated, but in other respects it is similar in construction to that shown in Fig. 2.

The drive chain is provided with lateral extensions in the form of anti-friction rollers 6, which are adapted to engage the rails or flanges 7 of the track-way structure, and thus provide suitable means for carrying the drive chain around said track-way. Said drive chain is further provided with the usual links 8 which are connected together by pintles 9, which pintles are extended to each side of the links for the purpose of forming journals for the anti-friction rollers 6 herein referred to. Also journaled upon the intermediate portion of each of the pintles, that is to say that portion between the chain links, is an anti-friction roller 10, which is adapted to engage between the teeth on the several sprocket wheels, thus reducing the friction between the said sprocket wheels and the drive chain, to a considerable degree.

It is to be understood that the track-way or guide herein shown, is a stationary structure around which the chain is carried and upon which the same is supported, and when so constructed, serves as a means for holding the chain in a steady position at all times during the driving of the several driven sprocket wheels. In this connection it might be stated that by providing such a track-way or guide, it enables a chain-gear to be employed without the objection and defects usually experienced.

In Fig. 7 the driving sprocket wheel is shown of triple form, the intermediate sprocket wheel of which is adapted to engage the main portion of the drive chain, that is to say, the anti-friction rollers 10, and the sprocket wheels carried at either side of said intermediate sprocket wheel will engage the lateral extensions of said drive chain.

The driven sprocket wheels are mounted upon their respective shafts, which shafts are journaled in suitable bearings conveniently positioned with reference to the track-way 4. In some instances it may be desired to construct the bearings for the shafts upon the track-way structure itself as substantially shown at 11 in Fig. 2 of the drawing. The usual clutches may also be provided in connection with said driven sprocket wheels so that the driven shafts may be thrown into and out of operation when so desired. By the use of such clutches any one of the driven shafts may be thus thrown out of operation without discontinuing the driving of the chain driving-gear. As will be readily understood, these driven shafts may be connected up in any well known way with different types of machinery which it is desired to operate. For instance, the driven shaft is shown in Fig. 6 as having a variable throw crank 12 and a pitman rod connection 12.

What I claim is:—

1. In a chain driving gear, in combination, a stationary track-way comprising spaced parallel guide flanges, an endless drive chain, pintles connecting the links of said chain, rollers carried by said pintles at opposite ends and traveling on said guide flanges, a single driving sprocket located between said flanges and engaging the chain inside the latter, and a driven sprocket engaging the chain from the outside.

2. In a chain driving gear, a chain having lateral extensions at the sides in the form of rollers, a sprocket engaging the intermediate or main portion of the chain, and means carried by the sprocket at the sides thereof to engage said rollers and thereby assist in driving the chain.

3. In a chain driving gear, a chain having lateral extensions at the sides in the form of rollers, and a sprocket wheel to drive said chain having an intermediate sprocket engaging the intermediate or main portion of the chain and sprockets at the sides of the intermediate sprocket to engage said rollers, as described.

In testimony whereof I affix my signature, in presence of two witnesses.

ROBERT HENRY BOWMAN.

Witnesses:
GRACE SCHULTZ,
JESSIE M. BEANE.